US008284783B1

(12) United States Patent
Maufer et al.

(10) Patent No.: US 8,284,783 B1
(45) Date of Patent: *Oct. 9, 2012

(54) SYSTEM AND METHOD FOR AVOIDING NEIGHBOR CACHE POLLUTION

(75) Inventors: Thomas A. Maufer, Menlo Park, CA (US); Ayaz Abdulla, Sunnyvale, CA (US); Norman K. Chen, Sunnyvale, CA (US); Ashutosh K. Jha, Sunnyvale, CA (US); Hemamalini Manickavasagam, San Jose, CA (US); Sameer Nanda, Cupertino, CA (US); Anand Rajagopalan, Saratoga, CA (US)

(73) Assignee: NVIDIA Corporation, Santa Clara, AZ (US)

( * ) Notice: Subject to any disclaimer, the term of this patent is extended or adjusted under 35 U.S.C. 154(b) by 565 days.

This patent is subject to a terminal disclaimer.

(21) Appl. No.: 11/299,010

(22) Filed: Dec. 9, 2005

Related U.S. Application Data (63) Continuation-in-part of application No. 11/280,134, filed on Nov. 15, 2005.

(51) Int. Cl.
*H04L 12/28* (2006.01)
*H04L 12/56* (2006.01)

(52) U.S. Cl. .................................. 370/395.54; 370/351

(58) Field of Classification Search .................. 370/229, 370/230, 351, 389, 392, 395.54, 232; 709/217, 709/245

See application file for complete search history.

(56) References Cited

U.S. PATENT DOCUMENTS

| 5,708,654 | A | * | 1/1998 | Arndt et al. | 370/242 |
|---|---|---|---|---|---|
| 5,920,699 | A | * | 7/1999 | Bare | 709/225 |
| 5,987,524 | A | * | 11/1999 | Yoshida et al. | 709/245 |
| 6,512,774 | B1 | * | 1/2003 | Vepa et al. | 370/401 |
| 6,560,630 | B1 | * | 5/2003 | Vepa et al. | 718/105 |
| 6,567,377 | B1 | | 5/2003 | Vepa et al. | |
| 6,590,861 | B1 | | 7/2003 | Vepa et al. | |
| 6,683,882 | B1 | | 1/2004 | Maufer et al. | |
| 6,687,758 | B2 | | 2/2004 | Craft et al. | |
| 6,785,738 | B1 | * | 8/2004 | Ivaturi | 709/245 |
| 6,938,092 | B2 | | 8/2005 | Burns | |

(Continued)

FOREIGN PATENT DOCUMENTS

GB 2418821 A * 4/2006

OTHER PUBLICATIONS

Office Action. U.S. Appl. No. 11/280,134. Dated Apr. 16, 2009.

(Continued)

*Primary Examiner* — Marsha D. Banks Harold
*Assistant Examiner* — Christopher Wyllie
(74) *Attorney, Agent, or Firm* — Patterson & Sheridan, LLP (57) ABSTRACT

A method of avoiding cache corruption when establishing a network connection includes the steps of transmitting a request to a computing device, where the request includes a masquerade layer-3 address, and receiving a reply transmitted by the computing device in response to the request, where the reply includes a MAC address associated with the computing device. Since the masquerade layer-3 address is unique relative to the computer network, computing devices within the network do no overwrite existing layer-3-to-MAC relationships in their respective caches with the layer-3-to-MAC relationship reflected in the request. Thus, the method enables a network connection to be initiated between two computing devices in the same computer network while avoiding neighbor cache pollution on other computing devices in that network.

20 Claims, 6 Drawing Sheets

U.S. PATENT DOCUMENTS

| | | | |
|---|---|---|---|
| 6,981,034 B2 | 12/2005 | Ding | |
| 7,191,331 B2* | 3/2007 | Maufer et al. | 713/153 |
| 7,249,191 B1* | 7/2007 | Hutchison et al. | 709/236 |
| 7,293,077 B1 | 11/2007 | Teo et al. | |
| 7,336,670 B1* | 2/2008 | Calhoun et al. | 370/401 |
| 7,379,423 B1* | 5/2008 | Caves et al. | 370/232 |
| 7,430,194 B2 | 9/2008 | Hong | |
| 7,464,183 B1* | 12/2008 | Ioffe et al. | 709/245 |
| 7,545,741 B1* | 6/2009 | Manickavasagam et al. | 370/230 |
| 7,580,415 B2* | 8/2009 | Hudson et al. | 370/395.6 |
| 7,769,004 B2* | 8/2010 | Johnson et al. | 370/389 |
| 7,840,706 B1* | 11/2010 | Abdulla et al. | 709/245 |
| 7,995,465 B2* | 8/2011 | Abdulla et al. | 370/218 |
| 8,134,928 B1* | 3/2012 | Manickavasagam et al. | 370/242 |
| 2001/0023460 A1* | 9/2001 | Boucher et al. | 709/250 |
| 2002/0035699 A1* | 3/2002 | Crosbie | 713/201 |
| 2002/0067733 A1* | 6/2002 | Stoeckl et al. | 370/401 |
| 2002/0087889 A1* | 7/2002 | Zaborovsky et al. | 713/201 |
| 2003/0005092 A1* | 1/2003 | Nelson et al. | 709/220 |
| 2003/0037163 A1* | 2/2003 | Kitada et al. | 709/236 |
| 2003/0086390 A1* | 5/2003 | Eschbach et al. | 370/329 |
| 2003/0088700 A1* | 5/2003 | Aiken | 709/245 |
| 2003/0120818 A1* | 6/2003 | Ho | 709/250 |
| 2003/0133450 A1* | 7/2003 | Baum | 370/389 |
| 2003/0185233 A1* | 10/2003 | Ji et al. | 370/466 |
| 2003/0233452 A1* | 12/2003 | Maufer et al. | 709/225 |
| 2003/0233576 A1* | 12/2003 | Maufer et al. | 713/201 |
| 2003/0237018 A1* | 12/2003 | Baba | 714/4 |
| 2004/0008682 A1* | 1/2004 | Miriyala | 370/395.1 |
| 2004/0071164 A1* | 4/2004 | Baum | 370/469 |
| 2004/0185887 A1* | 9/2004 | Wolman et al. | 455/516 |
| 2005/0100025 A1* | 5/2005 | Nagami et al. | 370/396 |
| 2005/0108407 A1* | 5/2005 | Johnson et al. | 709/228 |
| 2005/0220063 A1 | 10/2005 | Hong et al. | |
| 2005/0251549 A1* | 11/2005 | Hlasny | 709/203 |
| 2006/0010238 A1 | 1/2006 | Craft et al. | |
| 2006/0015635 A1* | 1/2006 | Fernandes et al. | 709/232 |
| 2006/0088037 A1* | 4/2006 | Finley et al. | 370/395.54 |
| 2006/0126619 A1* | 6/2006 | Teisberg et al. | 370/389 |
| 2006/0129676 A1* | 6/2006 | Modi et al. | 709/227 |
| 2006/0155563 A1* | 7/2006 | Banerjee et al. | 705/1 |
| 2006/0218273 A1* | 9/2006 | Melvin | 709/224 |
| 2006/0268851 A1* | 11/2006 | Baratakke et al. | 370/389 |
| 2007/0201490 A1* | 8/2007 | Mahamuni | 370/395.54 |
| 2007/0233809 A1* | 10/2007 | Brownell et al. | 709/218 |
| 2007/0299942 A1* | 12/2007 | Lu et al. | 709/220 |
| 2008/0285441 A1* | 11/2008 | Abdulla et al. | 370/225 |

OTHER PUBLICATIONS

Final Office Action. U.S. Appl. No. 11/280,134. Mailed U.S. Appl. No. 11/280,134.

* cited by examiner

SYSTEM AND METHOD FOR AVOIDING NEIGHBOR CACHE POLLUTION

CROSS-REFERENCE TO RELATED APPLICATION

This application is a continuation-in-part of the nonprovisional patent application titled, "System and Method for Avoiding ARP Cache Pollution," filed Nov. 15, 2005 and application Ser. No. 11/280,134. The subject matter of the nonprovisional patent application is hereby incorporated by reference.

BACKGROUND OF THE INVENTION

1. Field of the Invention

Embodiments of the present invention relate generally to the field of computer networking and more specifically to preventing cache pollution when a first computing device in a computer network initiates a connection with a second computing device in the computer network.

2. Description of the Related Art

A typical computer network includes of two or more computing devices coupled through a plurality of network connections. Each such computing device includes at least one network interface card (NIC) that implements an electrical interface between the computing device and the network. Typically, each computing device is connected to a network switch with an Ethernet cable that runs from the NIC to the network switch. Interconnecting computing devices through a network switch enables those computing devices to communicate with one another through the network switch, thereby forming a computer network.

Within a given computer network, the rate of data transmissions between two computing devices has historically been limited by the individual performance of each computing device, rather than the speed of the network. In recent years, improvements in computing device performance, especially in the area of network connection management, have allowed computing devices to generate data for network transmissions at a rate greater than the transmission rate of a single NIC. Consequently, many computing devices are now configured with multiple NICs, where each NIC is coupled to the network through an individual network connection (i.e., a separate Ethernet cable running to the network switch). In theory, with such a structure, the overall transmission rate of a computing device is equal to the sum of the individual transmission rates of the NICs included in the computing device. For example, if a computing device has three NICs, each having a transmission rate of one Gigabit per second, then the computing device should have an overall transmission rate of three Gigabits per second.

A desirable configuration for a computing device with multiple NICs is to designate a common Internet Protocol (IP) address for all of the NICs, while maintaining a unique Media Access Control (MAC) address for each NIC. Multiple NICs sharing a common IP address on a single computing device is referred to as a "team." One aspect of using a team configuration is that network traffic may be distributed among the NICs in the team such that the overall throughput of the team may be maximized. This type of operation is referred to as "load balancing." Another aspect of using a team configuration is that traffic may be migrated from a nonfunctional or unreliable NIC within the team to a functional or more reliable NIC within the team. This type of operation is referred to as "failover." Load balancing and failover improve the throughput and reliability of the team's network connections, improving the efficiency of the corresponding computing device within the network.

One drawback of using a team structure, however, is that the initiation of new connections by any of the NICs within the team can "pollute" the ARP caches of the other computing devices within the computer network. ARP cache pollution results when all of the NICs within a team defined on a particular computing device share a common IP address and that computing device uses a conventional ARP broadcast request to initiate a new connection with another computing device within the computer network. The mechanics of ARP cache pollution and the networking problems resulting from ARP cache pollution are set forth in the following example.

Figure 1:
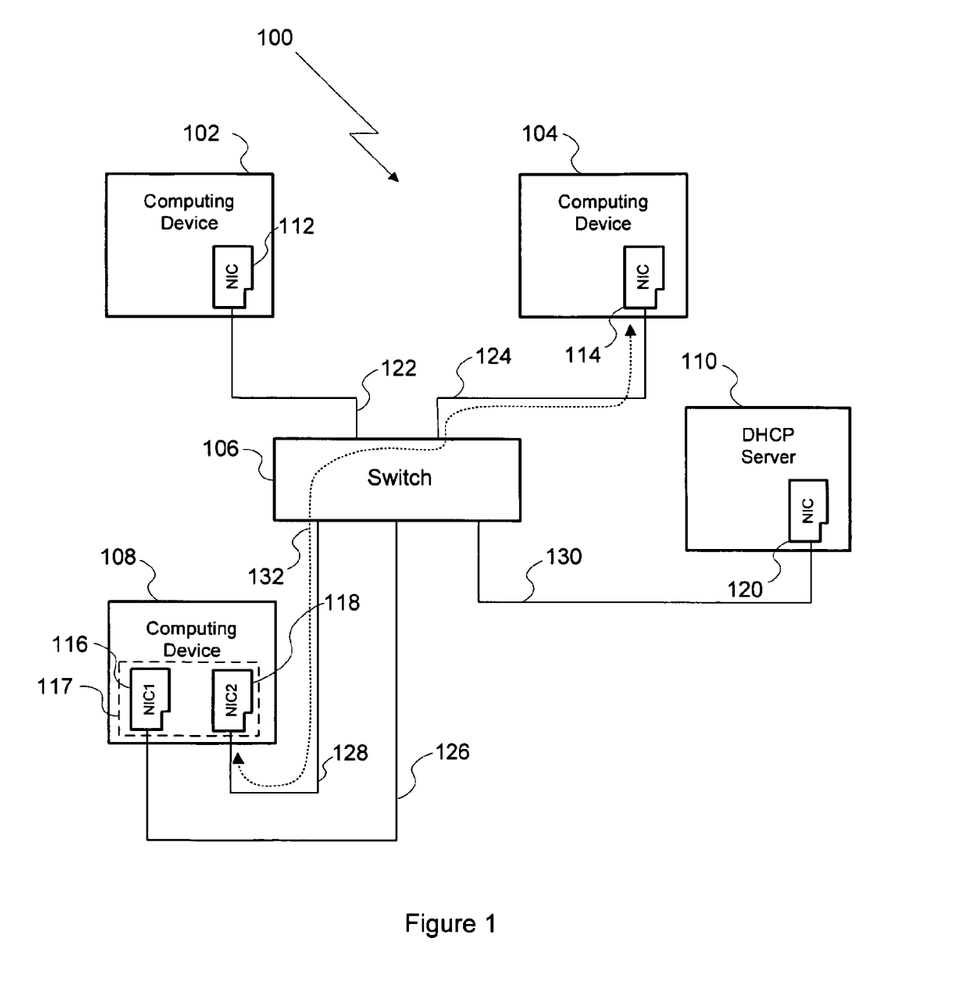
FIG. 1 illustrates a computer network that includes a first computing device having a first NIC and a second NIC configured as a team and an existing TCP/IP connection to a third computing device within the computer network.

FIG. 1 illustrates a computer network 100 that includes a first computing device 108, a second computing device 102, a third computing device 104, a switch 106, and a ("Dynamic Host Configuration Protocol") DHCP server 110. The first computing device 108 includes a first NIC ("NIC1") 116 and a second NIC ("NIC2") 118, each of which couples the first computing device 108 to the switch 106 through a network connection 126 and a network connection 128, respectively. The second computing device 102 includes a NIC 112, which couples the second computing device 102 to the switch 106 through a network connection 122. The third computing device 104 includes a NIC 114, which couples the third computing device 104 to the switch 106 through a network connection 124. The DHCP server 110, a specialized computing device, contains a NIC 120, which couples the DHCP server 110 to the switch 106 through a network connection 130.

Each computing device in the computer network 100, including the DHCP server 110, is configured to have a unique IP address. Additionally, the first NIC 116 and the second NIC 118 of the first computing device 108 are configured as a team 117 and therefore share a common IP address (i.e., the IP address assigned to the first computing device 108). As is well known, each computing device in the computer network 100 includes a device driver program (not shown) that controls each NIC within that particular computing device. Typically, the TCP/IP stack includes an ARP cache that tracks the IP addresses and corresponding MAC addresses associated with recent network communications through the computing device.

As also shown in FIG. 1, a TCP/IP connection 132 exists between the second NIC 118 of the first computing device 108 and the NIC 114 of the third computing device 104. For illustrative purposes only, this example assumes that the first computing device 108 initiates a new connection with the second computing device 102 through the first NIC 116. Because of the pre-existing TCP/IP connection 132, ARP cache pollution may occur in the third computing device 104 when the first computing device 108 initiates this second network connection. As set forth below, the origin of the ARP cache pollution problem lies in the way a network computing device typically establishes a new network connection—namely, by using an ARP broadcast request.

As is well-known, MAC addresses are used to route traffic within a computer network. Consequently, a first computing device within a network generally cannot initiate a connection with a second computing device within the network without knowing the MAC address of the second computing device. The purpose of an ARP broadcast request is to allow the first computing device to request the MAC address of a second computing device knowing only the IP address of the second computing device. Therefore, an ARP broadcast request usually precedes any direct communication between two computing devices in a given computer network. However, every ARP broadcast request includes the IP and MAC addresses of the transmitting machine. Since the computing devices within the network maintain a collection of recent IP-to-MAC address translations within their respective ARP caches, those computing devices may update their respective ARP caches upon receiving an ARP broadcast request to reflect the IP and MAC addresses that the transmitting machine included in its ARP broadcast request. ARP cache updates of this sort may result in ARP cache corruption.

Specific to the example, to initiate a connection with the second computing device 102, the first computing device 108 first has to determine the MAC address of the second computing device 102. Since the first computing device 108 is going to establish the connection through the first NIC 116, the first computing device 108 transmits an ARP broadcast request to the other computing devices within the computer network 100 that includes the IP address of the first computing device 108 and the MAC address of the first NIC 116. The ARP broadcast request is received by each of the other computing devices within the computer network 100 (i.e., the second computing device 102, the third computing device 104 and the DHCP server 110). The ARP cache of the third computing device 104 already includes an entry reflecting the IP address of the first computing device 108 and the MAC address of the second NIC 118 since these are the IP address and MAC address associated with the pre-existing TCP/IP connection 132 between the first computing device 108 and the third computing device 104. Since the ARP broadcast request includes an IP-to-MAC relationship (IP address of the first computing device 108 and MAC address of the first NIC 116) that is different than the IP-to-MAC relationship resulting from the TCP/IP connection 132 (IP address of the first computing device 108 and MAC address of the second NIC 118), the third computing device 104 may overwrite its ARP cache to reflect the "new" IP-to-MAC relationship for the first computing device 108 included in the ARP broadcast request. Such a change in the ARP cache of the third computing device 104 is referred to as "ARP cache pollution" because the ARP cache entry corresponding to the existing TCP/IP connection 132 (IP address of the first computing device 108 and MAC address of the second NIC 118) is overwritten with a new ARP cache entry corresponding to the ARP broadcast request transmitted by the first computing device 108 through the first NIC 116 (IP address of the first computing device 108 and MAC address of the first NIC 116).

Importantly, when the entry in the ARP cache of the third computing device 104 associated with TCP/IP connection 132 is overwritten to reflect the IP address of the first computing device 108 and the MAC address of the first NIC 116, the TCP/IP connection 132 is disrupted. Specifically, all traffic for the TCP/IP connection 132 is redirected from the second NIC 118 on the first computing device 108 to the first NIC 116. More generally, all traffic transmitted to the first computing device 108 by any computing device on the computer network 100 may be redirected to the first NIC 116 rather than being directed to some other previously configured NIC on the first computing device 108.

ARP cache pollution is particularly problematic in the face of established network connections, such as the TCP/IP connection 132, because those connections may be active and transferring data when they are interrupted and redirected, potentially resulting in data loss. Further, disrupting established network connections in this fashion may compromise any load balancing and/or failover settings previously in effect for the team 117 on the first computing device 108, leading to further data loss.

As the foregoing illustrates, what is needed in the art is a technique for initiating a new network connection between a first computing device in a computer network and a second computing device in the same network that avoids ARP cache pollution.

SUMMARY OF THE INVENTION

One embodiment of the invention sets forth a method for avoiding cache corruption when establishing a network connection. The method includes the steps of transmitting a request to a computing device, where the request includes a masquerade layer-3 address, and receiving a reply transmitted by the computing device in response to the request, where the reply includes a MAC address associated with the computing device. Since the masquerade layer-3 address is unique relative to the computer network, computing devices within the network do no overwrite existing layer-3-to-MAC relationships in their respective neighbor caches with the layer-3-to-MAC relationship reflected in the request. Consequently, computing devices that add the masquerade layer-3 address to their caches do not cause any real connections to be disturbed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As set forth above in the description of FIG. 1, an ARP broadcast request from the first NIC 116 of the first computing device 108 causes ARP cache pollution on the third computing device 104 because of the presence of the TCP/IP connection 132. Again, ARP cache pollution results from the inclusion of the IP address of the first computing device 108 in the ARP broadcast request packet. This IP address is referred to as the "sender's IP address" of the ARP broadcast request packet. However, the second computing device 102 does not require the sender's IP address to transmit an ARP reply to the first NIC 116 of the first computing device 108 because the MAC address of the first NIC 116 also is included in the ARP broadcast request. This MAC address is referred to as the "sender's MAC address" of the ARP broadcast request. As is well-known, the second computing device 102 uses the sender's MAC address to send an ARP reply to the first NIC 116 of the first computing device 108 rather than the sender's IP address. Thus, for purposes of the ARP broadcast request and the ARP reply, the sender's IP address is not used. However, as described above, the sender's IP address of the ARP broadcast request changes the ARP cache of any machine in the network 100 that is configured to update its ARP cache when it receives an ARP broadcast request.

In the present invention, ARP cache pollution is avoided by modifying the contents of the ARP broadcast request packet to use a sender's IP address having a value that is both legal for the network and unique within the network. The former condition is important because an ARP broadcast request packet using an IP address outside the designated IP address range for the network may not be accepted by all computing devices within the network. The "uniqueness" condition is important because an ARP broadcast request packet using an IP address that duplicates the IP address of the transmitting machine (or the IP address of another computing device in the network) may cause ARP cache pollution on different computing devices within the network. As described in further detail below, a "unique" IP address is used herein to refer to an IP address that is unique within the scope of the DHCP server associated with the network (e.g., the DHCP server 110 associated with the computer network 100).

As is well-known, a DHCP server in a given network is configured to know the legal range of addresses for the network, to assign IP addresses within the legal range to computing devices within the network and to manage a list of IP addresses that have been assigned to computing devices in the network. These qualities allow the DHCP server to provide a unique IP address whenever a computing device requests an IP address. Thus, the DHCP server can be used to provide additional unique IP addresses to a computing device in the network that has multiple NICs configured as a team, where the NICs share a common IP address already assigned to that computing device. These new, unique IP addresses (hereinafter also referred to as "masquerade IP addresses") may then be used by the computing device in ARP broadcast requests to set up new network connections through different NICs within the team without causing ARP cache pollution. Specifically, since the sender's IP address in each such ARP broadcast request is unique relative to the network (because the masquerade IP address is unique), the ARP broadcast request reflects a unique IP-to-MAC relationship. Therefore, the ARP broadcast request does not cause any computing device within the network to overwrite an existing IP-to-MAC relationship in its ARP cache, thereby preserving all existing network connections. A detailed discussion of this technique follows.

Figure 2A:
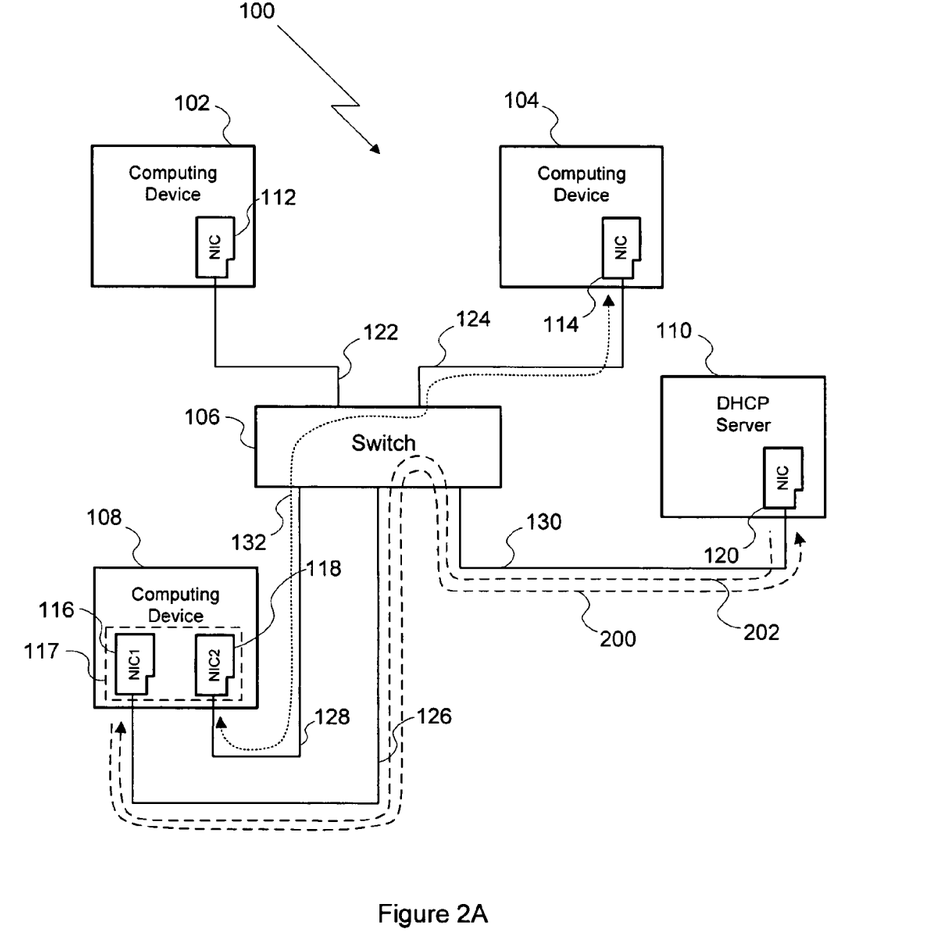
FIG. 2A shows a masquerade IP address request transmitted from the first computing device to the DHCP server and a resulting response from the DHCP server, according to one embodiment of the invention.

FIGS. 2A, 2B, 2C and 2D illustrate an example of the communications that create a new network connection between the first NIC 116 of the first computing device 108 and the second computing device 102 without causing ARP cache pollution. FIG. 2A shows a masquerade IP address request 200 transmitted from the first computing device 108 to the DHCP server 110 and a resulting response 202 transmitted by the DHCP server 110, according to one embodiment of the invention. As a precursor to the masquerade IP address request 200, the first computing device 108 generates a "masquerade MAC address" for the DHCP server 110 to ensure that the IP address generated by the DHCP server 110 and included in the response 202 is unique within the computer network 100. The masquerade MAC address may be any MAC address that is unique within the scope of the DHCP server 110. In one embodiment, the masquerade MAC address is generated by inverting the "local bit" within the MAC address of the first NIC 116. The location of the local bit within a MAC address is well known to those skilled in the art. As previously mentioned, the IP address included in the response 202 is referred to as the "masquerade IP address" and may be used by the first computing device 108 as the sender's IP address in all subsequent ARP broadcast requests. By doing so, the sender's IP address in each ARP broadcast request transmitted by the first computing device 108 is guaranteed to be unique within the computer network 100.

Figure 2B:
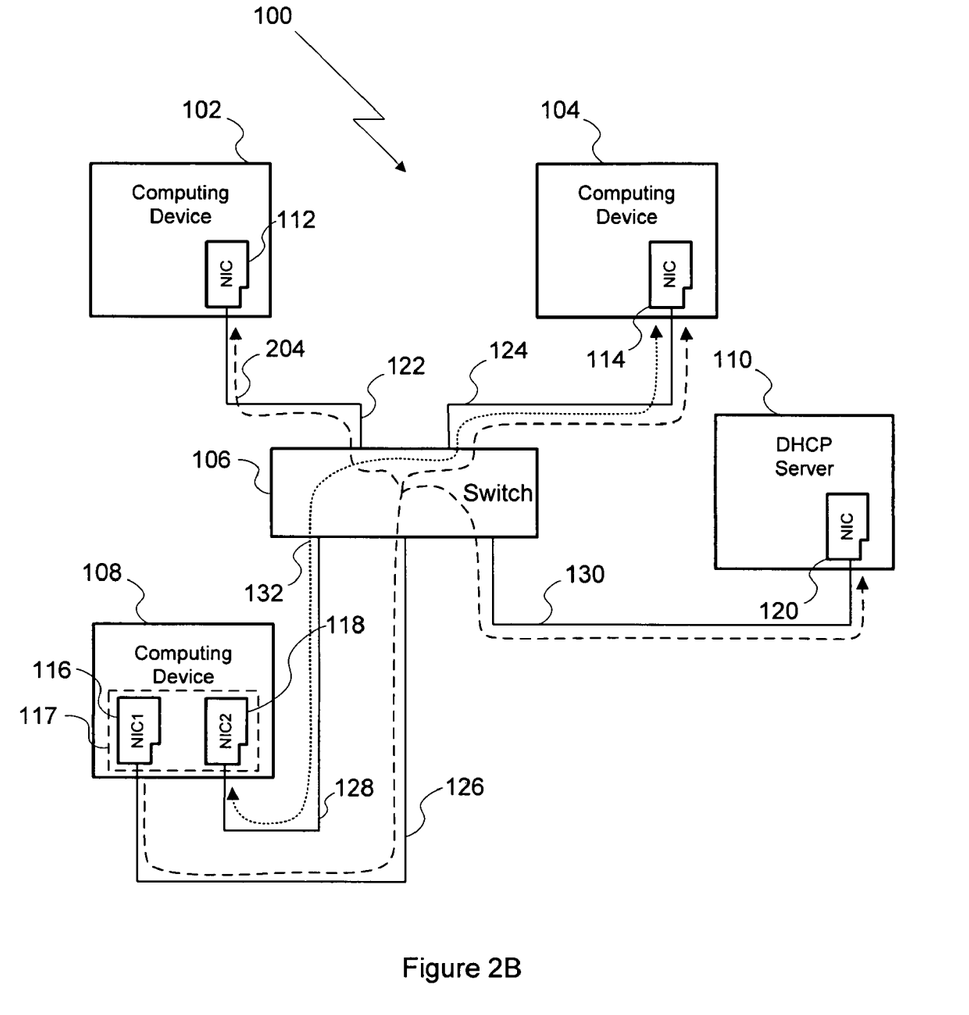
FIG. 2B illustrates an ARP broadcast request transmitted from the first NIC of the first computing device to the other computing devices within the computer network, according to one embodiment of the invention.

FIG. 2B illustrates an ARP broadcast request 204 from the first NIC 116 of the first computing device 108 to the other computing devices within the computer network 100, according to one embodiment of the invention. As previously described herein, the ARP broadcast request 204 uses the masquerade IP address as its sender's IP address. Additionally, the ARP broadcast request 204 uses the MAC address of the first NIC 116 as its sender's MAC address. Again, since the masquerade IP address is unique to the computer network 100, the ARP broadcast request has an IP-to-MAC relationship that is unique to the computing network 100 as well. Therefore, when the ARP broadcast request is transmitted, the other computing devices within the computer network 100 simply add this new IP-to-MAC relationship to their respective ARP caches instead of overwriting an existing IP-to-MAC relationship with the new IP-to-MAC relationship. Thus, as illustrated by the persistence of the TCP/IP connection 132 in FIG. 2B, the first computing device 108 is able to transmit an ARP broadcast request throughout the computer network 100 to determine a MAC address associated with the second computing device 102 while avoiding the ARP cache pollution problem.

Figure 2C:
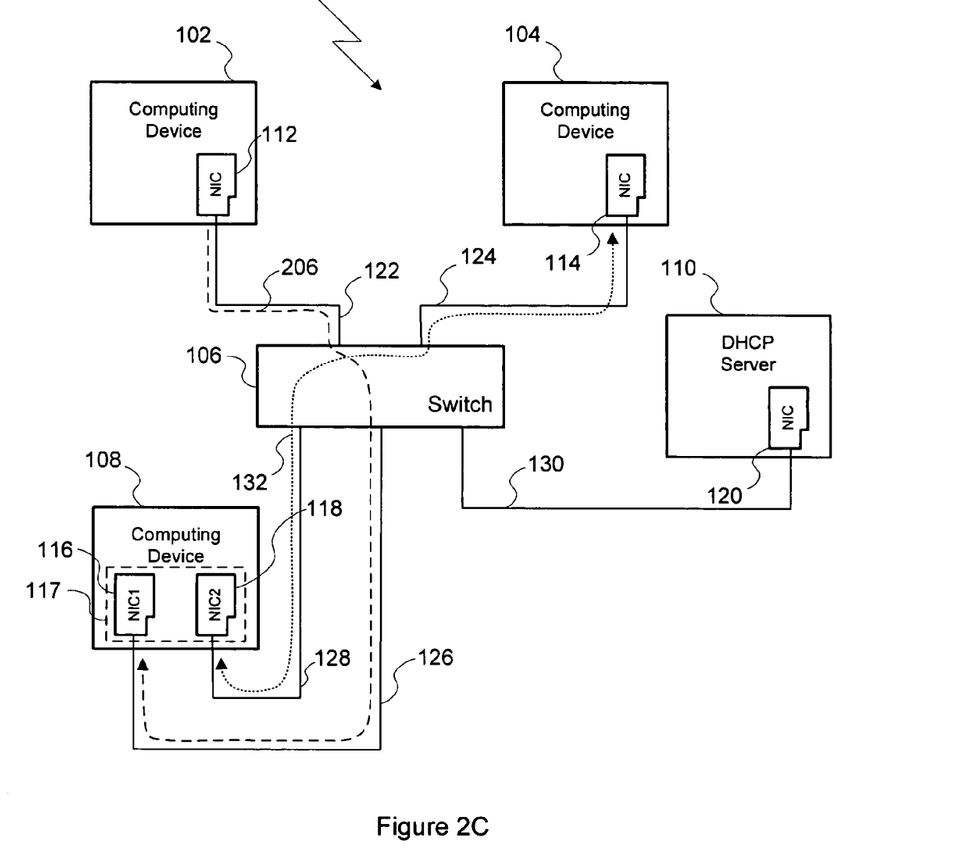
FIG. 2C illustrates an ARP unicast reply transmitted from the second computing device to the first NIC of the first computing device, according to one embodiment of the invention.

As is well known, the sender's MAC address in an ARP broadcast request enables an ARP reply to be transmitted to the NIC that transmitted the ARP broadcast request. This step is illustrated in FIG. 2C, where an ARP unicast reply 206 transmitted from the second computing device 102 to the first NIC 116 of the first computing device 108, according to one embodiment of the invention. Upon receiving the ARP unicast reply 206, the first computing device 108 is aware of the MAC address associated with the second computing device 102 (i.e., the MAC address of the NIC 112), allowing the first computing device 108 to initiate a network connection with the second computing device 102.

Figure 2D:
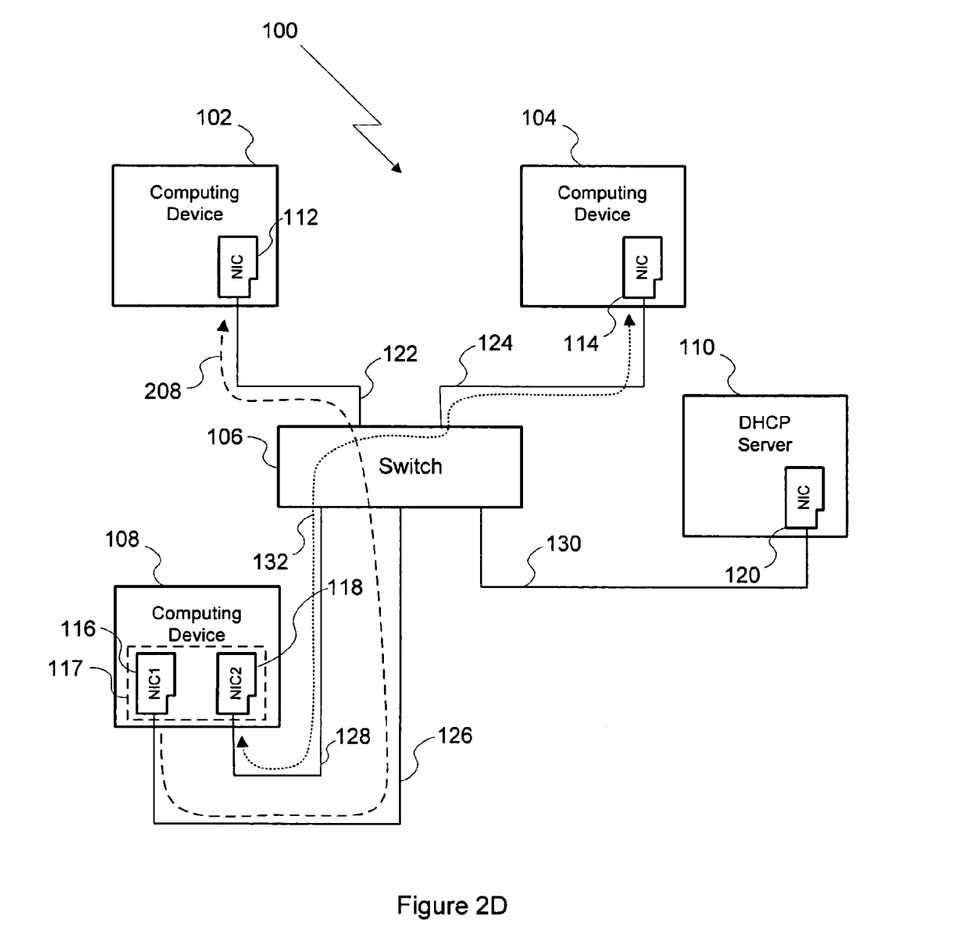
FIG. 2D illustrates a request to initiate a TCP/IP connection between the first computing device and the second computing device transmitted through the first NIC of the first computing device, according to one embodiment of the invention.

FIG. 2D illustrates a request 208 to initiate a TCP/IP connection between the first computing device 108 and the second computing device 102 transmitted through the first NIC 116 of the first computing device 108, according to one embodiment of the invention. Establishing this TCP/IP connection provides the first computing device 108 with two network connections—one with the second computing device 102 through the first NIC 116 and one with the third computing device 104 through the second NIC 118.

Figure 3:
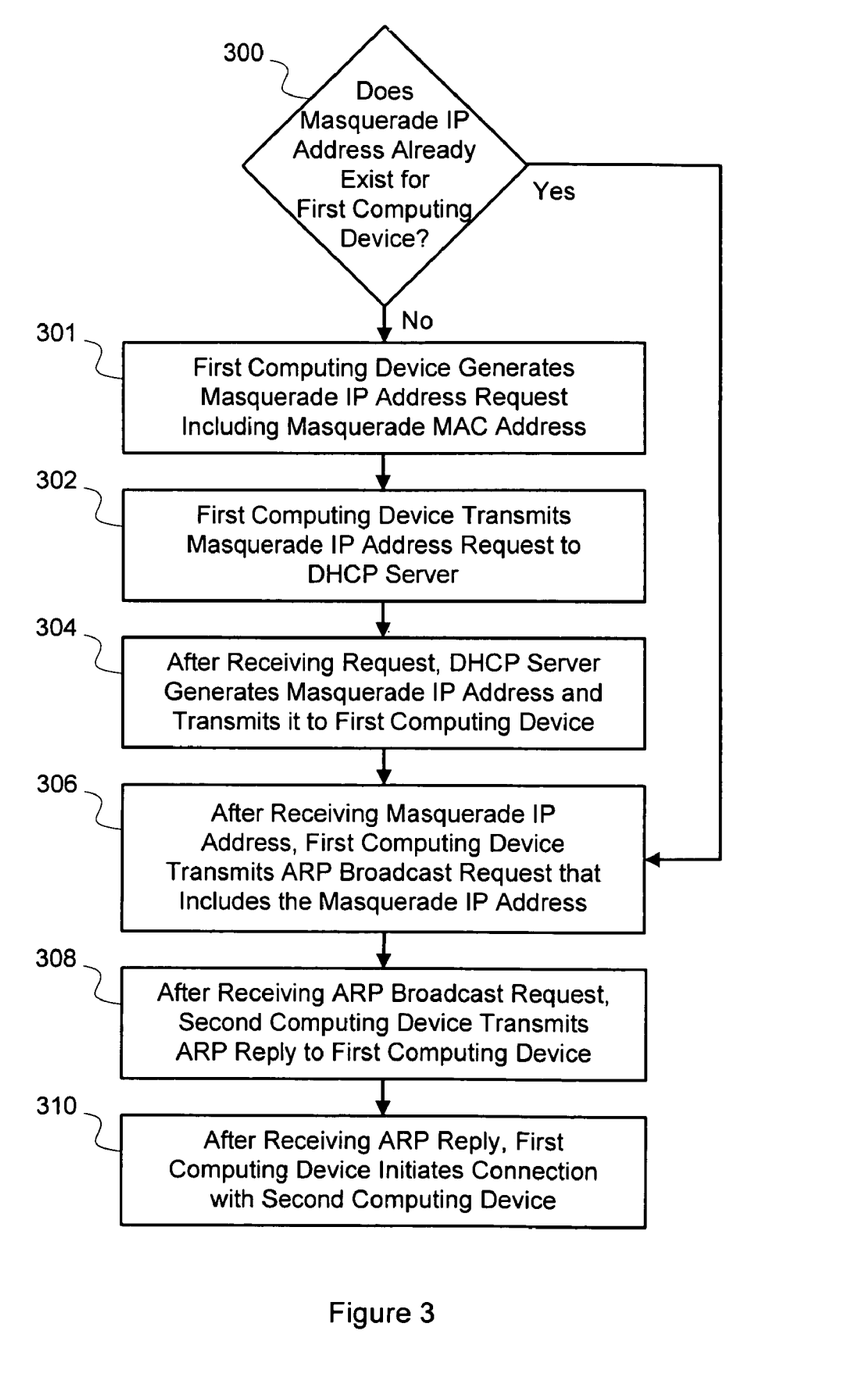
FIG. 3 is a flowchart of method steps for creating a TCP/IP connection between a first computing device and a second computing device in the same network such that ARP cache pollution is avoided, according to one embodiment of the invention.

FIG. 3 is a flowchart of method steps for creating a TCP/IP connection between a first computing device 108 and a second computing device 102 in the same network 100 such that ARP cache pollution is avoided, according to one embodiment of the invention. Although described in view of FIGS. 2A-2D, persons skilled in the art will understand that any system configured to perform the method steps, in any order, is within the scope of the invention.

The method for creating a TCP/IP connection starts in step 300, where the first computing device 108 determines whether a masquerade IP address from a previous TCP/IP connection exists in storage for the first computing device 108. If a masquerade IP address does not already exist in storage, the method generates a masquerade IP address request that includes a unique masquerade MAC address in step 301. In one embodiment, the masquerade MAC address is generated by inverting the local bit within the MAC address of the NIC through which the masquerade IP address request is transmitted (i.e., the first NIC 116 in the example set forth herein). In step 302, the first computing device 108 transmits the masquerade IP address request to the DHCP server 110 through the first NIC 116. In step 304, the DHCP server 110 generates a unique masquerade IP address in response to this request and transmits the masquerade IP address to the first computing device 108 via the first NIC 116. In step 306, after receiving the existing masquerade IP address from storage or the requested masquerade IP address from the DHCP server 110, the first computing device 108 transmits an ARP broadcast request to all computing devices in the network through the first NIC 116. This ARP broadcast request includes the masquerade IP address as the sender's IP address and the unmodified (i.e., where the local bit not inverted) MAC address of the first NIC 116 as the sender's MAC address. In step 308, the second computing device 102 receives the ARP broadcast request from the first computing device 108 and recognizes that the target IP address included in the ARP broadcast request matches its own IP address. In response, the second computing device 102 transmits an ARP unicast reply to the first computing device 108 addressed to the sender's MAC address of the ARP broadcast request (i.e., the MAC address of the first NIC 116). The ARP unicast reply includes the IP address of the second computing device 102 as the sender's IP address and the MAC address of the NIC 112 of the second computing device 102 as the sender's MAC address. Importantly, through the ARP unicast reply, the first computing device 108 learns the MAC address associated with the second computing device 102 (i.e., the MAC address of NIC 112) and, therefore, is able to set up a network connection directly with the second computing device 102. In step 310, upon receiving the ARP unicast reply from the second computing device 102, the first computing device initiates a TCP/IP connection with the second computing device 102 via the first NIC 116. If, however, a stored masquerade IP address exists in storage from a previous TCP/IP connection in step 300, the first computing device retrieves the existing masquerade IP address for reuse and continues the method from step 306.

Persons skilled in the art will recognize that between steps 308 and 310, the first computing device 108 may transmit an unsolicited ARP unicast request to the second computing device 102 that includes the conventional (i.e., non-masquerade) IP address of the first computing device 108 and the MAC address of the first NIC 116 prior to initiating the network connection with the second computing device 102. In such cases, the ARP unicast request would be transmitted from the first NIC 116 in the first computing device 108 to the second computing device 102. The request would create an entry in the ARP cache of the second computing device 102 for the conventional IP address of the first computing device 108.

One advantage of the disclosed system and method is that it enables a TCP/IP connection to be initiated between two computing devices in the same computer network while avoiding ARP cache pollution on other computing devices in that network. Among other things, this capability further enables a computing device configured with a team of NICs to set up network connections through different NICs within the team without disturbing any load balancing and/or failover settings in effect for the team. The system and method thus increases throughput and transmission reliability within the computer network.

In alternative embodiments of the systems and methods described herein, the MAC address used as the masquerade MAC address may be a MAC address that is unique to the local machine initiating the new network connection and not otherwise being used by that machine. Thus, if the first computing device 108 were to include a third NIC that is unique to computing device 108 and is not being used by the computing device 108, then the MAC address of the third NIC could be used as the masquerade MAC address. In addition, the masquerade IP address does not have to be generated by transmitting the masquerade IP address request to the DHCP server, as described herein. In alternative embodiments, the masquerade IP address may be generated in any technically feasible fashion. For example, the masquerade IP address may be automatically generated by the first computing device 108 or manually generated. Further, once a masquerade IP address has been generated for the computing device 108, the masquerade IP address could be shared with other NICs in the team or with other computing devices in the computer network 100 since the only technical requirement for the masquerade IP address is that the address is unique within the scope of the DHCP server.

The technique of using a masquerade layer-3 address, such as the masquerade IP addressed previously discussed herein, to learn the MAC address of a target machine when initiating a connection with the target machine may be implemented with other types of networking protocols where the problem of cache pollution also exists. One such class of protocols are those that use a broadcast- or multicast-based neighbor discovery process to determine the MAC address (or link-layer address) of a NIC in the target machine. As is well-known, in a typical neighbor discovery process, the sending machine (i.e., the machine initiating the network connection) transmits a broadcast/multicast neighbor discovery request message to its neighbor machines that includes the sender's (non-masquerade) layer-3 address, the sender's MAC address and the layer-3 address of the target machine. Upon receiving the neighbor discovery request message, the target machine transmits a unicast response to the sending machine that includes the MAC address of the target machine. The unicast response allows the sending machine to learn the MAC address. Once the sending machine knows the MAC address of the target machine, the sending machine can initiate the network connection with the target machine.

In a computer network configured to implement this type of neighbor discovery process, each machine has a "neighbor cache" that includes a listing of the known layer-3-to-MAC translations for the different, machines on the network. Similar to the ARP cache pollution problem previously described herein, neighbor cache pollution may result when the sending machine includes multiple NICs configured as a team, a network connection already exists between one of those NICs and a second machine on the network, and the sending machine attempts to initiate a new network connection through another NIC in the team with a third machine on the network. In such a scenario, each machine on the computer network already has an layer-3-to-MAC relationship in its neighbor cache for the sending machine that corresponds to the existing network connection between the sending machine and the second machine (layer-3 address of the sending machine and MAC address of the NIC in the sending machine handling the existing network connection with second machine). The broadcast/multicast neighbor discovery request message that the sending machine transmits to its neighbor machines to learn the MAC address of the third computing device includes a new layer-3-to-MAC relationship for the sending machine (layer-3 address of the sending machine and MAC address of the NIC in the sending machine handling the new network connection with the third machine). As previously described, if the second machine updates its neighbor cache to reflect the new layer-3-to-MAC relationship included in the neighbor discovery request message, the layer-3-to-MAC relationship corresponding to the existing network connection will be overwritten, disrupting that connection.

To address this problem, a masquerade layer-3 address may be used in the broadcast/multicast neighbor discovery request message as the sender's layer-3 address. Again, since the masquerade layer-3 address is unique to the computer network, the layer-3-to-MAC relationship reflected in neighbor discovery request message also is unique to the network. Consequently, when the neighbor discovery request is transmitted, the other machines within the computer network simply add this new layer-3-to-MAC relationship to their respective neighbor caches instead of overwriting any existing layer-3-to-MAC relationships with the new layer-3-to-MAC relationship. Thus, neighbor cache pollution is avoided. As before, in response to the neighbor discovery request message, the target machine transmits a unicast response to the sending machine that includes the MAC address of the target machine. Upon receiving this unicast response and learning the MAC address of the target machine, the sending machine can initiate the new network connection with the target machine. Further, similar to the method of FIG. 3, the sending machine may transmit an unsolicited unicast neighbor discovery request message to the target machine that includes the conventional (i.e., non-masquerade) layer-3 address of the sending machine and the MAC address of the NIC in the sending machine handling the new network connection prior to initiating the connection with the target machine. This type of neighbor discovery request message would create an entry in the neighbor cache of the target machine for the conventional layer-3 address of the sending machine.

In the specific context of IP Version 6 (IPv6), the sending machine transmits a multicast neighbor solicitation message to its neighbor machines that includes a masquerade IPv6 address as the sender's IPv6 address. Upon receiving the neighbor solicitation message, the target machine transmits a solicited unicast neighbor advertisement to the sending machine that includes the MAC address (link-layer address) of the target machine. Upon receiving the neighbor advertisement and learning the MAC address of the target machine, the sending machine can initiate the new network connection with the target machine. As mentioned above, the sending machine may transmit an unsolicited unicast neighbor solicitation message to the target machine that includes the conventional IPv6 address of the sending machine and the MAC address of the NIC in the sending machine handling the new network connection prior to initiating that connection with the target machine. Again, this neighbor solicitation message would create an entry in the neighbor cache of the target machine for the conventional IPv6 address of the sending machine. The address resolution process for IPv6 is well-known in the art and is described in RFC 2461, which is hereby incorporated by reference.

While the foregoing is directed to embodiments of the present invention, other embodiments of the invention may be devised without departing from the basic scope thereof. For example, one alternative embodiment may include the use of separate device driver programs for each NIC in a team. In yet another embodiment, if the DHCP server 110 is configured with static layer-3-to-MAC mappings of the machines on the computer network 100, then the first computing device 108 may generate a masquerade MAC address by inverting the local bit of its MAC address or by selecting any MAC address not already being used within the computer network 100 (i.e., not included in the layer-3-to-MAC address mappings of the DHCP server 110). Finally, those skilled in the art will recognize that the exemplary computer network described herein may be expanded to include additional computing devices (with or without teams) and that teams may include more than two NICs.

The scope of the present invention is determined by the claims that follow.

We claim:

1. A method implemented by a first endpoint computing device in a computer network of avoiding cache corruption when establishing a network connection, the method comprising:

transmitting a broadcast request to a second endpoint computing device and a third endpoint computing device, wherein the request includes a media access control (MAC) address associated with a first network interface card (NIC) in the first endpoint computing device and a masquerade layer-3 address associated with the first endpoint computing device that is different than a layer-3 address currently associated with the first endpoint computing device, wherein a first cache included in the third endpoint computing device stores a first relationship between the layer-3 address currently associated with the first endpoint computing device and a MAC address associated with a second NIC in the first endpoint computing device, and, in response to receiving the broadcast request the first cache, stores a second relationship between the masquerade layer-3 address and the MAC address associated with the first NIC without modifying the first relationship, wherein, in response to receiving the broadcast request, a second cache in the second computing device stores a third relationship between the masquerade layer-3 address and the MAC address currently associated with the first NIC, and wherein the masquerade layer-3 address is generated by providing a masquerade MAC address that is different than the MAC address associated with the first NIC to a dynamic host configuration protocol (DHCP) server;

receiving a reply transmitted by the second endpoint computing device in response to the request, wherein the reply includes a media access control (MAC) address associated with the second endpoint computing device; and establishing a network connection with the second endpoint computing device using the MAC address associated with the second endpoint computing device.

2. The method of claim 1, wherein the request to the second endpoint computing device comprises an address resolution protocol (ARP) broadcast request.

3. The method of claim 2, wherein the reply transmitted by the second endpoint computing device comprises an ARP unicast reply.

4. The method of claim 1, wherein the request to the second endpoint computing device comprises a broadcast or multicast neighbor discovery request message.

5. The method of claim 4, wherein the broadcast or multicast neighbor discovery request message comprises a multicast neighbor solicitation message.

6. The method of claim 5, wherein the reply transmitted by the second endpoint computing device comprises a solicited unicast neighbor advertisement.

7. The method of claim 1, further comprising the step of transmitting an unsolicited unicast request to the second endpoint computing device after receiving the reply but prior to initiating the network connection.

8. The method of claim 7, wherein the unsolicited unicast request comprises an unsolicited ARP unicast request.

9. The method of claim 7, wherein the unsolicited unicast request comprises an unsolicited unicast neighbor discovery request message.

10. The method of claim 9, wherein the unsolicited unicast neighbor discovery request message comprises an unsolicited unicast neighbor solicitation message.

11. A non-transitory computer-readable medium storing instructions for causing a first endpoint computing device to avoid cache corruption when establishing a network connection with a second endpoint computing device by performing the steps of:
   transmitting a broadcast request to a second endpoint computing device and a third endpoint computing device, wherein the request includes a media access control (MAC) address associated with a first network interface card (NIC) in the first endpoint computing device and a masquerade layer-3 address associated with the first endpoint computing device that is different than a layer-3 address currently associated with the first endpoint computing device, wherein a first cache included in the third endpoint computing device stores a first relationship between the layer-3 address currently associated with the first endpoint computing device and a MAC address associated with a second NIC in the first endpoint computing device, and, in response to receiving the broadcast request the first cache, stores a second relationship between the masquerade layer-3 address and the MAC address associated with the first NIC without modifying the first relationship, wherein, in response to receiving the broadcast request, a second cache in the second computing device stores a third relationship between the masquerade layer-3 address and the MAC address currently associated with the first NIC, and wherein the masquerade layer-3 address is generated by providing a masquerade MAC address that is different than the MAC address associated with the first NIC to a dynamic host configuration protocol (DHCP) server;
   receiving a reply transmitted by the second endpoint computing device in response to the request, wherein the reply includes a media access control (MAC) address associated with the second endpoint computing device; and
   establishing a network connection with the second endpoint computing device using the MAC address associated with the second endpoint computing device.

12. The computer-readable medium of claim 11, wherein the request to the second endpoint computing device comprises a broadcast or multicast neighbor discovery request message.

13. The computer-readable medium of claim 12, wherein the broadcast or multicast neighbor discovery request message comprises a multicast neighbor solicitation message.

14. The computer-readable medium of claim 13, wherein the reply transmitted by the second endpoint computing device comprises a solicited unicast neighbor advertisement.

15. The computer-readable medium of claim 11, further comprising the step of transmitting an unsolicited unicast neighbor discovery request message to the second endpoint computing device after receiving the reply but prior to initiating the network connection.

16. The computer-readable medium of claim 15, wherein the unsolicited unicast neighbor discovery request message comprises an unsolicited unicast neighbor solicitation message.

17. A system configured to avoid cache corruption when establishing a network connection, the system comprising:
   a first endpoint computing device configured to transmit a broadcast or multicast request that includes a media access control (MAC) address associated with the first endpoint computing device and a masquerade layer-3 address associated with the first endpoint computing device that is different than a layer-3 address currently associated with the first endpoint computing device to a second endpoint computing device and a third endpoint computing device, wherein a first cache included in the third endpoint computing device stores a first relationship between the layer-3 address currently associated with the first endpoint computing device and a MAC address associated with a second NIC in the first endpoint computing device, and, in response to receiving the broadcast request the first cache, stores a second relationship between the masquerade layer-3 address and the MAC address associated with the first NIC without modifying the first relationship, wherein, in response to receiving the broadcast request, a second cache in the second computing device stores a third relationship between the masquerade layer-3 address and the MAC address currently associated with the first NIC, and wherein the masquerade layer-3 address is generated by providing a masquerade MAC address that is different than the MAC address associated with the first NIC to a dynamic host configuration protocol (DHCP) server, and
   wherein the second endpoint computing device that is configured to transmit a reply to the first endpoint computing device in response to the broadcast or multicast request, wherein the reply includes a MAC address associated with the second endpoint computing device.

18. The system of claim 17, wherein the broadcast or multicast request transmitted by the first endpoint computing device comprises a broadcast or multicast neighbor discovery request message.

19. The system of claim 18, wherein the broadcast or multicast neighbor discovery request message comprises a multicast neighbor solicitation message.

20. The method of claim 1, wherein the masquerade MAC address is generated by inverting a local bit included in the MAC address currently associated with the first endpoint computing device.

* * * * *

UNITED STATES PATENT AND TRADEMARK OFFICE
CERTIFICATE OF CORRECTION

PATENT NO. : 8,284,783 B1
APPLICATION NO. : 11/299010
DATED : October 9, 2012
INVENTOR(S) : Thomas A. Maufer et al.

It is certified that error appears in the above-identified patent and that said Letters Patent is hereby corrected as shown below:

Title Page, Assignee item (73):

Please delete "AZ" and insert -- CA -- therefor.

Signed and Sealed this
Thirtieth Day of April, 2013

Teresa Stanek Rea
*Acting Director of the United States Patent and Trademark Office*